US007795525B2

(12) United States Patent
Sato

(10) Patent No.: US 7,795,525 B2
(45) Date of Patent: Sep. 14, 2010

(54) ACOUSTIC-EFFECT ASSIGNMENT CONTROLLING APPARATUS AND COMPUTER READABLE MEDIUM HAVING A COMPUTER PROGRAM FOR CONTROLLING ASSIGNMENT OF ACOUSTIC EFFECTS

(75) Inventor: Hiroki Sato, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 322 days.

(21) Appl. No.: 12/075,725

(22) Filed: Mar. 13, 2008

(65) Prior Publication Data

US 2008/0223201 A1 Sep. 18, 2008

(30) Foreign Application Priority Data

Mar. 16, 2007 (JP) ............................ 2007-069213

(51) Int. Cl.
*G01P 3/00* (2006.01)
*G10H 1/02* (2006.01)

(52) U.S. Cl. ............................ 84/626; 84/609; 84/615; 84/622; 84/649; 84/653; 84/659; 84/662

(58) Field of Classification Search ....................... None
See application file for complete search history.

(56) References Cited

U.S. PATENT DOCUMENTS

| | | | | |
|---|---|---|---|---|
| 5,262,586 | A * | 11/1993 | Oba et al. | 84/723 |
| 5,602,358 | A * | 2/1997 | Yamamoto et al. | 84/662 |
| 5,703,312 | A * | 12/1997 | Takahashi et al. | 84/626 |
| 6,091,012 | A * | 7/2000 | Takahashi | 84/626 |
| 2003/0196541 | A1* | 10/2003 | Ishida et al. | 84/622 |

FOREIGN PATENT DOCUMENTS

| | | |
|---|---|---|
| JP | 2002-258844 A | 9/2002 |
| JP | 2003-15643 A | 1/2003 |

* cited by examiner

*Primary Examiner*—Marlon T Fletcher
(74) *Attorney, Agent, or Firm*—Frishauf, Holtz, Goodman & Chick, P.C.

(57) ABSTRACT

When it is determined that Insertion Effect Block 20*n* for adding the same acoustic effect is found, CPU 13 assigns the Insertion Effect Block 20*n* for adding the same acoustic effect to a tone color part PTs whose tone color information has been changed, and when it is determined that Insertion Effect Block 20*n* for adding the same acoustic effect is not found, CPU 13 sets acoustic-effect information included in tone color information set to the tone color part PTs whose tone color information has been changed, thereby assigning the Insertion Effect Block 20*n* to the tone color part PTs whose tone color information has been changed.

9 Claims, 9 Drawing Sheets

FIG. 11

| PARAMETER NAME | PARAMETER NAME IN FLOW CHART | RANGE OF VALUE | MEANING |
|---|---|---|---|
| Effect Enable | EE | 0(Off), 1(On) | WHETHER EFFECT IS USED ? |
| Algorithm | AL | 0 ~ 7 | EFFECT ALGORITHM |
| Parameter[p] | PR[p] | 0 ~ 127 | GENERAL PURPOSE PARAMETERS FOR EFFECT |
| Level | LV | 0 ~ 127 | OUTPUT LEVEL OF EFFECT |
| Pan | PN | 0 ~ 64 ~ 127 | OUTPUT PANNING OF EFFECT |

FIG. 12

| VARIABLES | VARIABLE NAME IN FLOW CHART | RANGE OF VALUE | MEANING |
|---|---|---|---|
| Use | US | 0(NOT IN USE) ~ 1(IN USE) | WHETHER EFFECT IS IN USE ? |
| History | HI | 0~(32bit MAX) | HISTORY NUMBER OF ASSIGNMENT |
| Number of Oscillator | NO | 0 ~ 32 | NUMBER OF OSCILLATORS USED AT PRESENT |
| Algorithm | AL | 0 ~ 7 | EFFECT ALGORITHM |
| Parameter[p] | PR[p] | 0 ~ 127 | GENERAL PURPOSE PARAMETERS FOR EFFECT |
| Level | LV | 0 ~ 127 | OUTPUT LEVEL OF EFFECT |
| Pan | PN | 0 ~ 64 ~ 127 | OUTPUT PANNING OF EFFECT |

FIG. 13

| VARIABLES | VARIABLE NAME IN FLOW CHART | RANGE OF VALUE | MEANING |
|---|---|---|---|
| Total History | TH | 0 ~ (32bit MAX) | HISTORY NUMBER OF ASSIGNMENT |

FIG. 14

| VARIABLES | VARIABLE NAME IN FLOW CHART | RANGE OF VALUE | MEANING |
|---|---|---|---|
| Line Select | LS | 0 ~ 3, 4(Direct) | WHETHER EFFECT IS IN USE ? |
| Tone Number | TN | 0 ~ 255 | NUMBER OF SELECTED TONE |

ACOUSTIC-EFFECT ASSIGNMENT CONTROLLING APPARATUS AND COMPUTER READABLE MEDIUM HAVING A COMPUTER PROGRAM FOR CONTROLLING ASSIGNMENT OF ACOUSTIC EFFECTS

CROSS-REFERENCE OF RELATED APPLICATIONS

The present application is based upon and claims the benefit of priority from the prior Japanese Patent Application No. 2007-069213, filed Mar. 16, 2007, the entire contents of which are incorporated herein by reference.

BACKGROUND OF THE INVENTION

1. Field of the Invention

The present invention relates to an acoustic effect assignment controlling apparatus for controlling assignment of acoustic effects to be added to a musical tone signal generated in a musical tone generating apparatus and to a computer readable medium having recorded thereon a computer program for controlling assignment of acoustic effects to a musical tone signal.

2. Description of the Related Art

In general, electronic musical instruments are provided with effect functions for adding various acoustic effects onto a musical tone signal generated therein. The effect function serves to give realistic sensation onto the musical tone signal generated therein, thereby realizing fresh representation. Among the effect functions, an insertion effect function adds an acoustic effect to each tone color part (performance part) of a musical tone signal, and allows a user to make more real and delicate sounds. Meanwhile, a conventional effect function executes a mixing process on the entire musical tone signal and adds acoustic effects to the musical tone signal thus subjected to the mixing process. Therefore, it is hard for the conventional effect function to add separate acoustic effects to tone color parts of the musical tone signal, respectively.

The insertion effect function described above can be used to select arbitrary effect algorithms from among a plurality of effect algorithms and to set the selected effect algorithms to insertion effects, thereby assigning the insertion effects to tone color parts which a user wants to add acoustic effects, wherein the number of insertion effects to be assigned is limited.

As described above, the insertion effect function is limited in the number of insertion effects (effect resource) which can be assigned to tone color parts at the same time. Therefore, if the user assigns the insertion effects to the tone color parts of a musical tone signal without paying attention to the limited number of the insertion effects to be assigned, the number of the insertion effects to be assigned is simply squandered, and the assigned insertion effects contribute nothing in making user's imaged or desired sounds.

Meanwhile, there have been proposed various methods of assigning insertion effects. The methods of assigning insertion effects are classified broadly into two categories, one includes methods in which the user manually assigns insert effects separately to performance parts (for example, refer to JP 2003-15643 A), and the other one includes methods that automatically search for an insertion effect not in use and assigns the found insertion effect to the performance part (for example, refer to JP 2002-258844 A).

But, the method disclosed in to JP 2003-15643 A has a troublesome disadvantage that require the user to understand setting information about which effect algorithm has been set or whether no effect algorithm has been set, for setting appropriate insertion effects to tone color parts.

Though the method disclosed in JP-2002-258844 A has no troublesome disadvantage that requires the user to manage setting information as required in the method of JP 2003-15643 A, the method of JP 2002-258844 A automatically searches for an used insertion effects and assigns the found insertion effects to the performance part of a musical tone signal. Therefore, even if the same acoustic effect is used for different tone color parts, a problem can arise that the same effect algorithm has been set to different insertion effects, uselessly consuming the limited number of insertion effects to be assigned. At worst, the method of JP 2002-258844 A does not help the user in making his or her desired sounds but can disturb the user in making good sounds.

The present invention has been made in consideration of the above disadvantages of the conventional techniques, and has an object to provide a technique that automatically adds acoustic effects separately to musical tone signals generated based on tone color information set to plural tone color parts, without disturbing the user in making his or her desired sounds.

SUMMARY OF THE INVENTION

According to one aspect of the invention, there is provided an acoustic-effect assignment controlling apparatus which comprises a certain number of acoustic-effect adding units for adding acoustic effects independently of each tone color part to musical tone signals based on acoustic-effect information included in tone color information, wherein the certain number of the acoustic-effect adding units is less than the number of the tone color parts and the musical tone signals are generated based on plural pieces of tone color information set to plural tone color parts, respectively, and an assignment controlling unit for setting to the acoustic-effect adding unit the acoustic-effect information included in the tone color information set to the tone color part, thereby assigning the acoustic-effect adding unit to the tone color part, wherein the assignment controlling unit comprises a judging unit for, when the original tone color information set to either of the tone color parts has been changed to another tone color information, judging whether or not an acoustic-effect adding unit is found for adding the same acoustic effect as an acoustic effect based on acoustic-effect information included in the another tone color information, i.e. a changed tone color information, and an assigning unit for, when the judging unit determines that an acoustic-effect adding unit is found for adding the same acoustic effect as the acoustic effect based on the acoustic-effect information included in the changed tone color information, assigning the acoustic-effect adding unit for adding the same acoustic-effect information to the tone color part whose original tone color information has been changed, and for, when the judging unit determines that no acoustic-effect adding unit is found for adding the same acoustic effect as the acoustic effect based on the acoustic-effect information included in the changed tone color information, setting the acoustic-effect information included in the color tone information set to the tone color part whose original tone color information has been changed to an acoustic-effect adding unit selected based on a predetermined selection reference, thereby assigning the acoustic-effect adding unit to the tone color part whose original tone color information has been changed.

According to another aspect of the invention, there is provided a computer readable medium mounted on an acoustic-effect assignment controlling apparatus and having recorded thereon an acoustic-effect assignment controlling program when executed to make a computer implement an acoustic-effect assigning method, wherein acoustic-effect assignment controlling apparatus has a certain number of acoustic-effect adding units for adding acoustic effects independently of each tone color part to musical tone signals based on acoustic-effect information included in tone color information, wherein the certain number of the acoustic-effect adding units is less than the number of the tone color parts and the musical tone signals are generated based on plural pieces of tone color information set to plural tone color parts, respectively, and a computer for setting to the acoustic-effect adding unit the acoustic-effect information included in the tone color information set to the tone color part, thereby assigning the acoustic-effect adding unit to the tone color part, and wherein the acoustic-effect assigning method comprises a judging step for, when the tone color information set to either of the tone color parts has been changed, judging whether or not an acoustic-effect- adding unit is found for adding the same acoustic effect as an acoustic effect based on acoustic-effect information included in the changed tone color information, and an assigning step for, when it is determined that an acoustic-effect adding unit is found for adding the same acoustic effect as the acoustic effect based on the acoustic-effect information included in the changed tone color information, assigning the acoustic-effect adding unit for adding the same acoustic-effect information to the tone color part whose original tone color information has been changed, and for, when it is determined that an acoustic-effect adding unit is not found for adding the same acoustic effect as the acoustic effect based on the acoustic-effect information included in the changed tone color information, setting the acoustic-effect information included in the color tone information set to the tone color part whose original tone color information has been changed to an acoustic-effect adding unit selected based on a predetermined selection reference, thereby assigning the acoustic-effect adding unit to the tone color part whose original tone color information has been changed.

BRIEF DESCRIPTION OF THE DRAWINGS

FIG. 11 is a view showing parameters of effect information.

FIG. 12 is a view showing management parameters defined for each Insertion Effect Block.

FIG. 13 is a view showing a management parameter relating to the Insertion Effect Block.

FIG. 14 is a view showing management parameters defined for each tone color part.

DETAILED DESCRIPTION OF THE PREFERRED EMBODIMENTS

Figure 1:
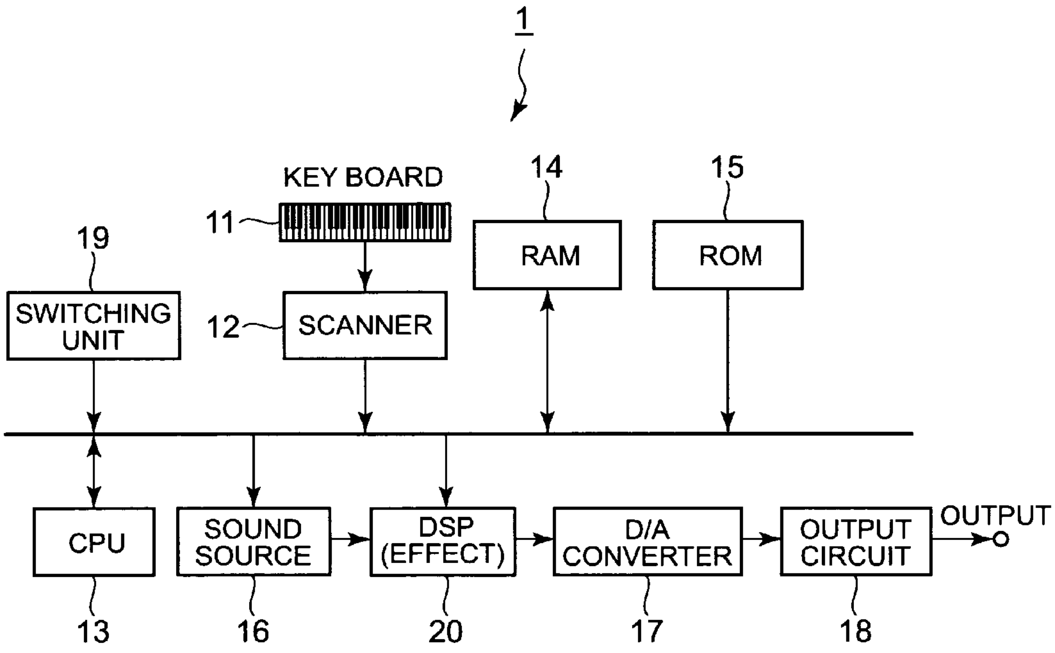
FIG. 1 is a block diagram of a circuit configuration of an embodiment of a musical tone generating apparatus according to the present invention.

Now, preferred embodiments of the present invention will be described with reference to the accompanying drawings. FIG. 1 is a block diagram of a circuit configuration of a musical tone generating apparatus 1 according to an embodiment of the present invention. The musical tone generating apparatus 1 comprises a key board unit 11 having a plurality of keys, which are played by a user, a scanner 12 for scanning the plurality of keys of the keyboard unit to detect a key played state, CPU (Central Processing Unit) 13 for controlling the whole operation of the musical tone generating apparatus 1, RAM (Random Access Memory) 14 serving as a work area for CPU 13, ROM (Read Only Memory) 15 for storing various computer programs to be run by CPU 13 and initial data, a sound source 16 for generating musical tones, DSP (Digital Signal Processor) 20 for performing a digital signal process on musical tones output from the sound source 16 to add an acoustic effect to each tone color part, D/A converter 17 for converting a musical tone signal output from the sound source 16 and/or a musical tone signal output from DSP into an analog signal, and an output circuit 18 for performing a filtering process and amplifying process on the analog signal output from the D/A converter 17 to output sounds from a speaker. The musical tone generating apparatus is provided with a switching unit 19 to be operated by the user to input instructions to change a tone color (program change) and/or other instructions.

The sound source 16 has 32 oscillators (OSC) 16Am (m=1, 2, 3, . . . 32). Each oscillator generates a single musical tone. Further, the sound source 16 is provided with plural sound channels and can generate polyphonic musical tones, as shown in FIG. 2.

Figure 2:
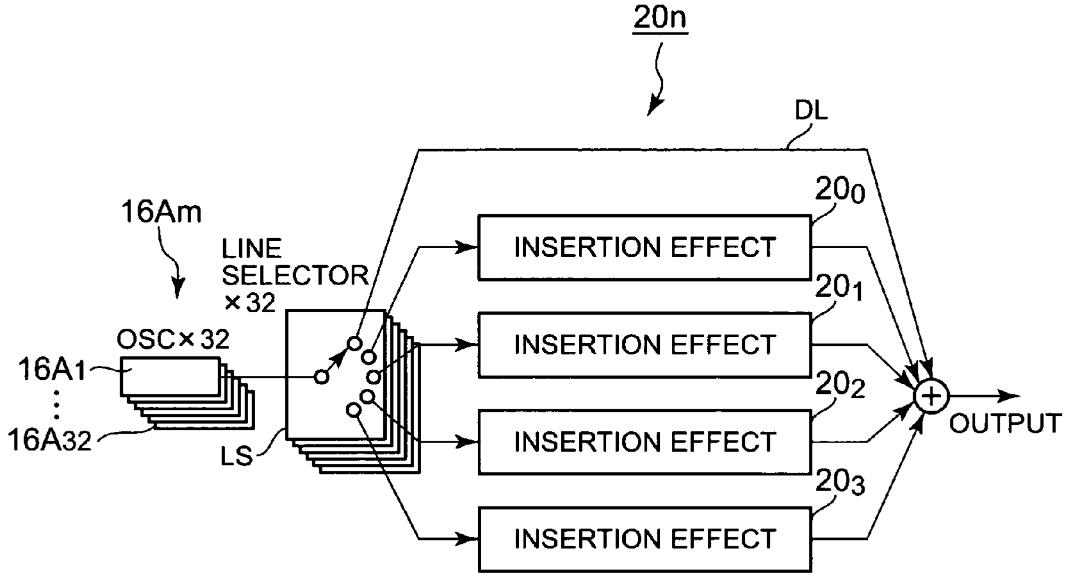
FIG. 2 is a view showing a configuration of a sound source unit and DSP in the musical tone generating apparatus.

DSP 20 has 32 line selectors LS prepared for oscillators 16Am (m=1, 2, 3, . . . 32) respectively and 4 Insertion Effect Blocks 20*n* (n=0, 1, 2, 3), as shown in FIG. 2.

The line selector LS for each of the oscillators 16Am (m=1, 2, 3, . . . 32) can be connected selectively to either one of 4 Insertion Effect Blocks 20*n* (n=0, 1, 2, 3) or to a Direct Line DL, wherein DL is not connected to any Insertion Effect block 20*n*.

When a desired effect algorism is selected from a plurality of previously registered effect algorisms, and set to Insertion Effect Block 20*n*, then the Insertion Effect Block 20*n* works as an insertion effect (hereinafter sometimes, simply "Effects") for adding an acoustic effect corresponding to the effect algorism. The Insertion Effect Block 20*n* can add the acoustic effect corresponding to the selected effect algorism to a musical tone generated by the oscillator 16Am connected to said Insertion Effect Block 20*n* through the line selector LS.

As described with reference to FIG. 2, the acoustic effect can be added to a musical tone generated by the oscillator 16Am in the sound source 16 by Insertion Effect Block 20n in DSP 20, but setting of an effect algorism to the Insertion Effect Block 20n and selection of the line selector LS are managed by CPU 13.

Figure 3:
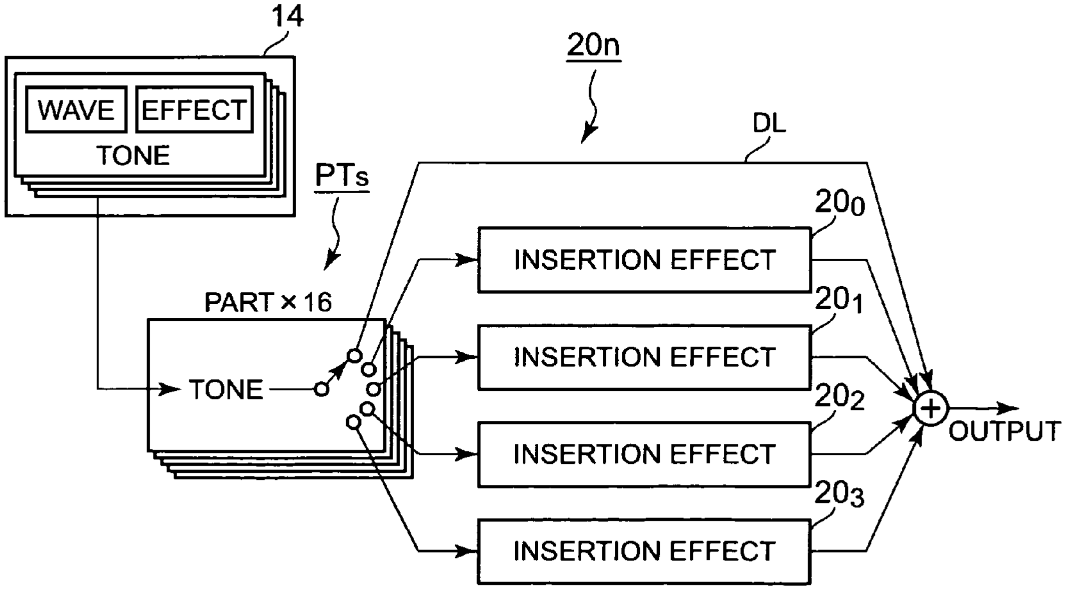
FIG. 3 is a view illustrating a functional concept for explaining tone color parts in the musical tone generating apparatus.

Relationship between concept of the tone color part managed by CPU 13 and Insertion Effect Block 20n will be described with reference to FIG. 3. For example, the tone color parts PTs (s=1, 2, . . . 16) include 16 parts, as shown in FIG. 3. At sound generation, CPU 13 automatically assigns the oscillators 16Am of the sound source 16 to the tone color parts PTs to manage a musical tone signal generated by the musical tone generating apparatus 1.

CPU 13 reads tone color information (Tone) from ROM 14 and sets the same information to the tone color parts TPs, in response to a tone color switching instruction to switch a tone color, when the switching unit 19 is operated by the user. The tone color information includes waveform information (Wave) that characterizes tone colors of a musical tone signal and effect information (Effect) relating acoustic effects to be added to the musical tone signal. The waveform information of the tone color information read by CPU 13 is supplied to the sound source 16, and the oscillator 16An of the sound source 16 generates a user's desired musical tone signal based on the supplied waveform information. Further, the effect information of the tone color information read by CPU 13 is supplied to DSP 20 and Insertion Effect Block 20n of the DSP 20 adds acoustic effects to the musical tone signal based on the supplied effect information.

The effect information includes information for deciding what sort of acoustic effects is added to the tone color of the musical tone signal generated on the basis of the waveform information or whether the acoustic effects should not be added to such tone color. Referring to the effect information, CPU 13 performs a controlling process to assign Insertion Effect Blocks 20n of DSP 20 to the tone color parts PT. As a result, Insertion Effect Blocks 20n is also assigned to a sound generation channel.

Now, operation of the musical tone generating apparatus 1 having the above circuit configuration will be described with reference to flow charts of FIGS. 4 to 10.

Referring to the flow chart of FIG. 4, a main routine process executed in the musical tone generating apparatus will be described.

CPU 13 executes a predetermined initializing process at step S1 to set the musical tone generating apparatus to a predetermined initializing state. Then, CPU 13 executes a switching process corresponding to a switching operation at step S2, when the user operates the switching unit 19, and further executes a key operation process corresponding to key operation at step S3, when the user plays the key board unit 11. Further, CPU 13 executes at step S4 processes other than the above processes, such as a time adjusting process for setting a period of one cycle of the main routine process constant, an accompaniment process if any, and a process for displaying data on a display unit (not shown) of the musical tone generating apparatus 1.

Figure 4:
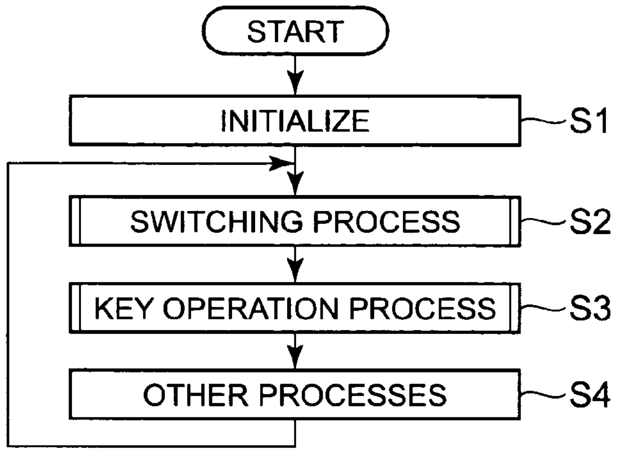
FIG. 4 is a flow chart of a main routine process in the musical tone generating apparatus.
Figure 5:
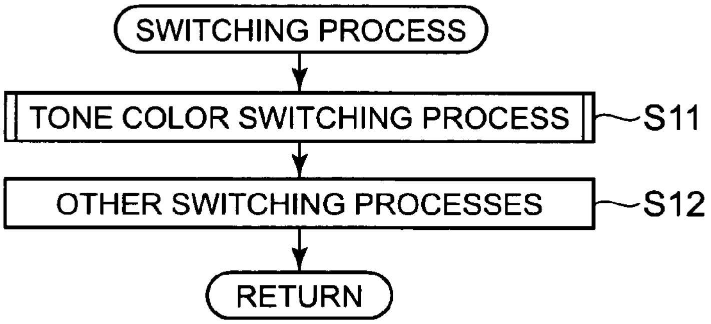
FIG. 5 is a flow chart of a switching process in the musical tone generating apparatus.

CPU 13 executes the switching process at step S2 in FIG. 4, that is, CPU 13 executes a process in response to operation of tone color relating parts of the switching unit 19 at step S11 in FIG. 5. Thereafter, CPU 13 executes processes in response to other operation of the switching unit 19 at step S12.

Figure 6:
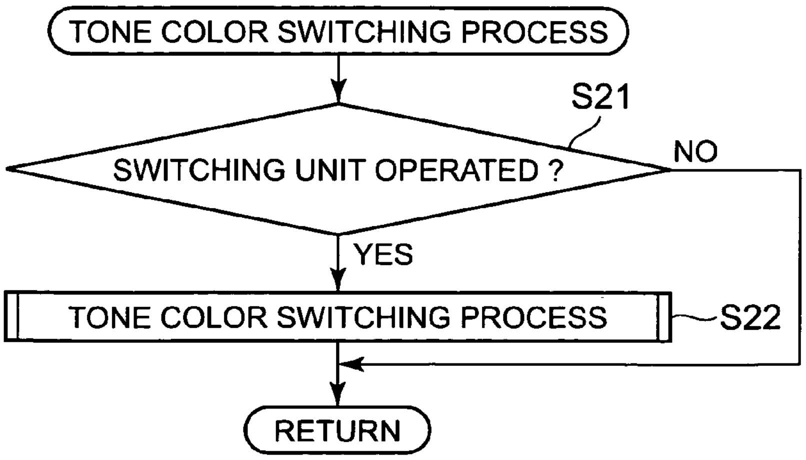
FIG. 6 is a flow chart of a tone color switching process in the musical tone generating apparatus.

CPU 13 executes the process in response to operation of tone color relating parts of the switching unit 19 at step S11 in FIG. 5, that is, CPU 13 judges at step S21 in FIG. 6 whether the tone color relating parts of the switching unit 19 have been operated or not, and executes a tone color switching process at step S22 when the tone color relating parts of the switching unit 19 have been operated.

Now, the tone color switching process executed at step S22 in FIG. 6 will be described in detail with reference to flow charts shown in FIGS. 7A, 7B and 7C. At first, parameters to be used in the color switching process will be described.

In FIG. 11 are shown various sorts of parameters of the effect information in tone color information (Tone) The effect information includes parameters such as "Effect Enable" for determining whether Effects should be used or not, "Algorithm" for defining an algorithm of Effect, "Parameter[p]" for defining a general-purpose parameter of Effect, "Level" for defining an output level of Effect, and "Pan" for defining a panning position of an output of Effect. For explanation of the tone color switching process, variable names used in the flow chart of FIG. 7 are represented in abbreviation such as "EE", "AL", "PR[p], "LV", and "PN" a shown in a table of FIG. 11.

The general-purpose parameters of Effects are parameters for characterizing acoustic effects prepared for algorithms of Effects or 8 sorts of algorithms (p=0, 1, 2 . . . 7) in the present embodiment. The acoustic effect is defined by the effect algorithm and the general-purpose parameter.

Figure 7A:
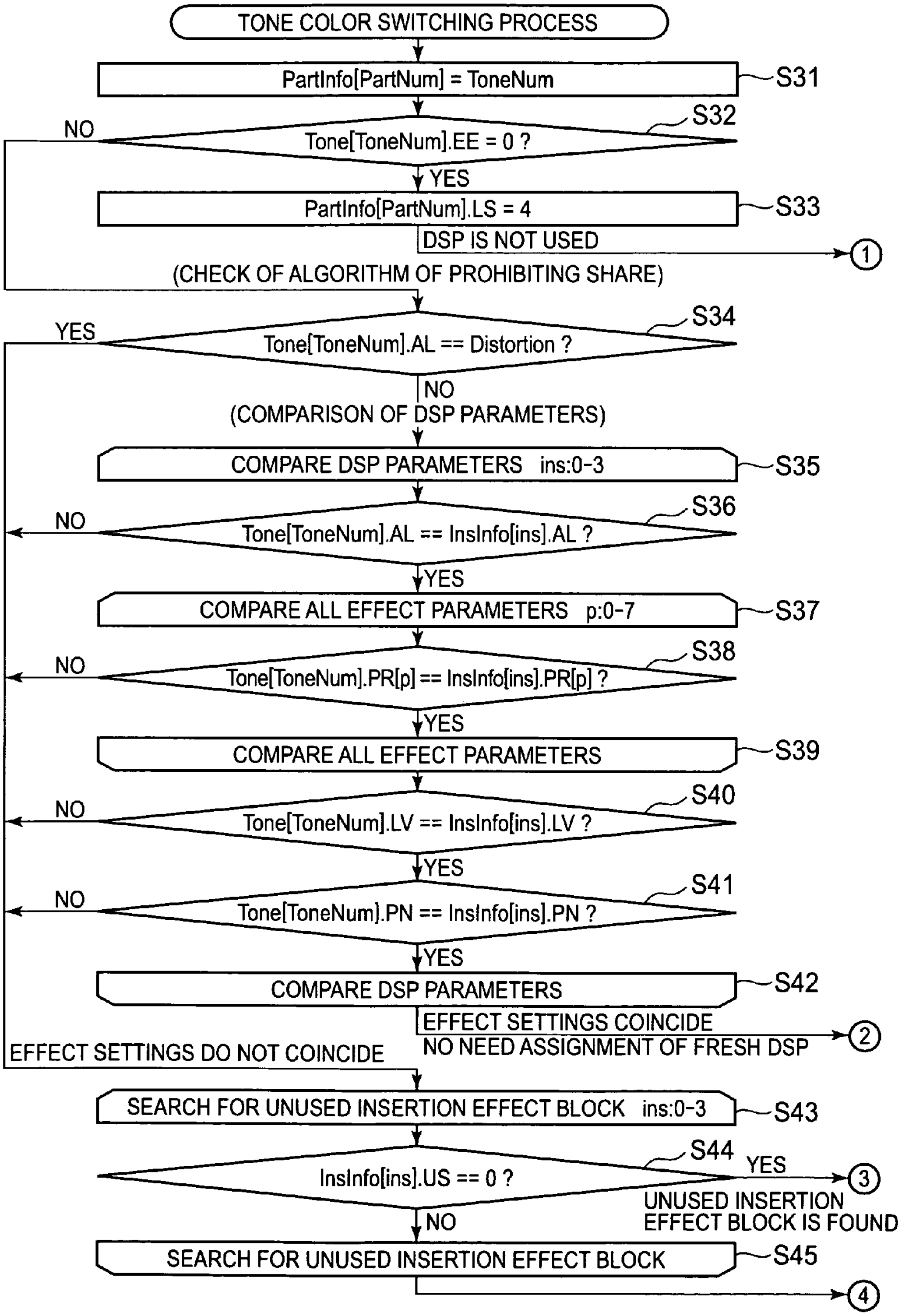
FIG. 7A is a first flow chart illustrating the detailed tone color switching process in the musical tone generating apparatus.
Figure 7B:
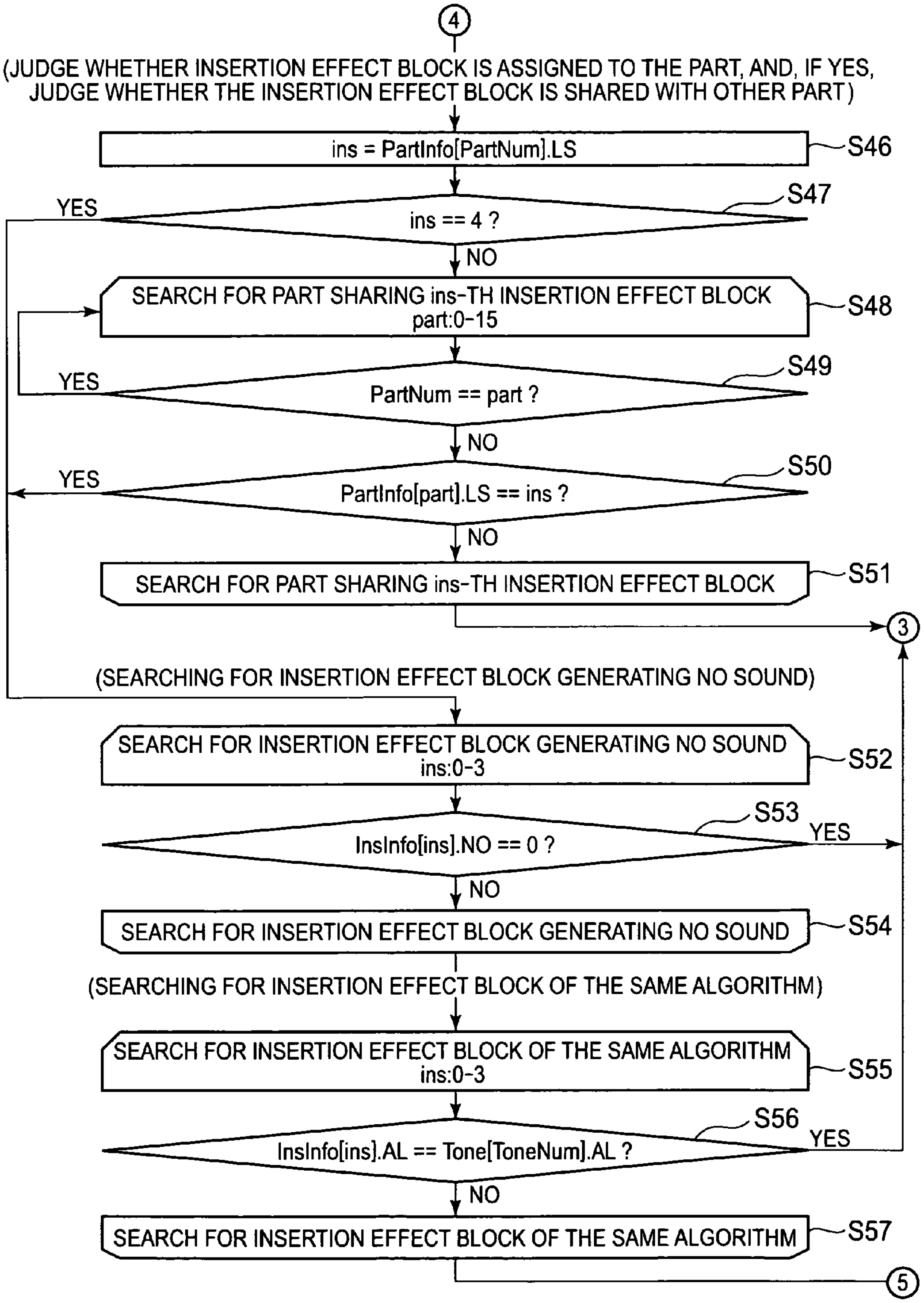
FIG. 7B is a second flow chart illustrating the detailed tone color switching process in the musical tone generating apparatus.
Figure 7C:
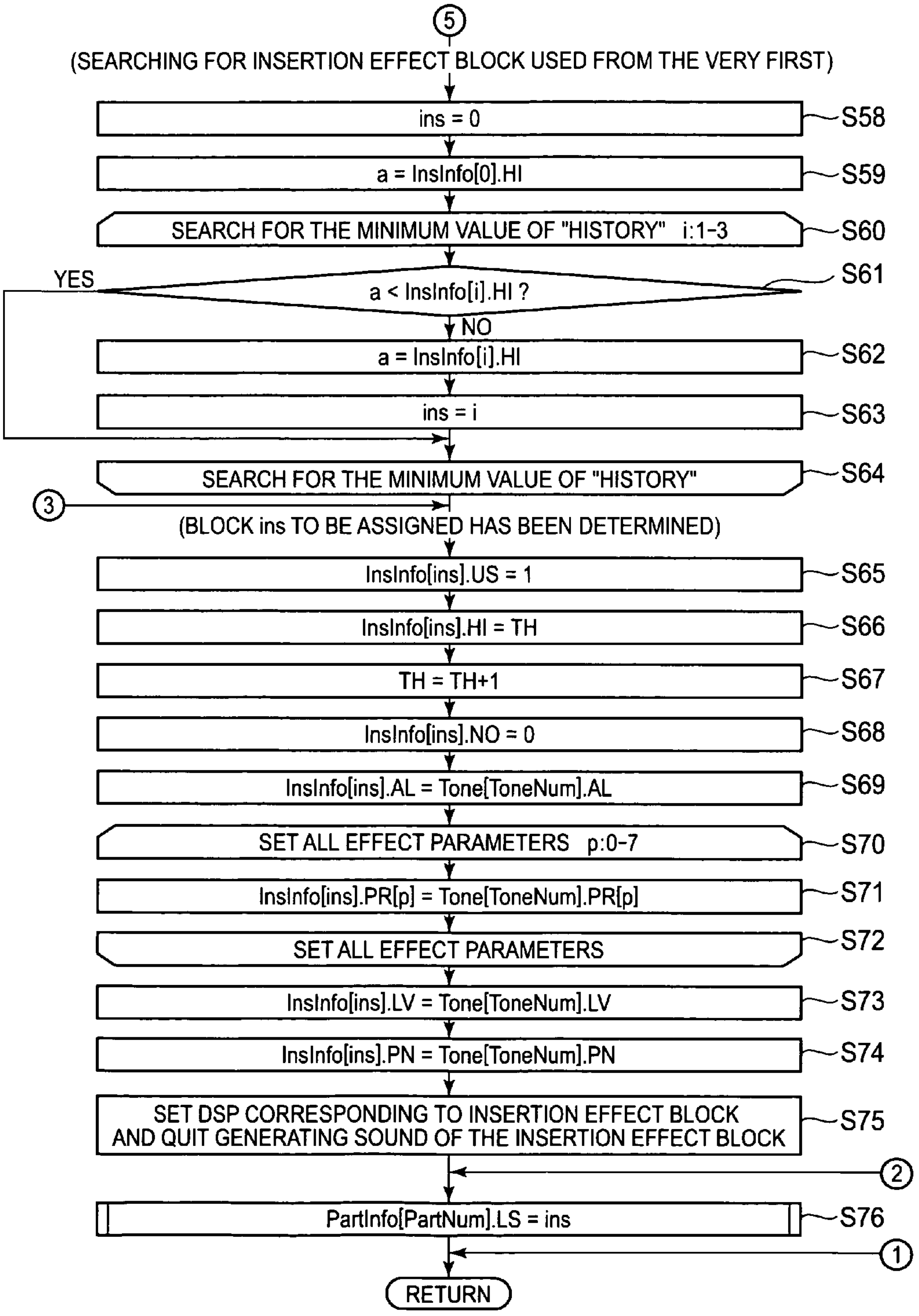
FIG. 7C is a third flow chart illustrating the detailed tone color switching process in the musical tone generating apparatus.

In the flow charts shown in FIGS. 7A, 7B and 7C, the parameters in the effect information shown in FIG. 11 are represented in "Tone", and "Tone [tone color number].parameter name" identifies a particular parameter. In the present embodiment, 256 sets of tone color information (tone color number=0, 1, 3, . . . 255) are prepared, and the tone color number identifies the tone color information. For example, a parameter "Parameter [p]" (p=3) of effect information in tone color information whose tone color number is 9 (tone color number =9) is represented by "Tone[9].PR[3]".

In FIG. 12 are shown management parameters which are defined for Insertion Effect Blocks 20r respectively. The management parameters defined for each Insertion Effect Block 20n include parameters such as "Use" for determining whether Insertion Effect Block 20n is used or not, "History" for defining a history number of assignment, "Number of Oscillator" for defining the number of the oscillator 16Am which is input at present, "Algorithm" for defining an algorithm of Effect, "Parameter[p]" for defining a general-purpose parameter of Effect, "Level" for defining an output level of Effect, and "Pan" for defining a panning position of an output of Effect. For explanation of the tone color switching process, variable names used in the flow chart of FIG. 7 are represented in abbreviation such as "US", "HI", "No", "AL", "PR[p], "LV", and "PN" as shown in a table of FIG. 12.

In FIG. 13 is shown a management parameter which relates to Insertion Effect Block 20n and is defined independently of the Insertion Effect Block 20n. A parameter of "Total History" for defining a history number of assignment is included in the management parameter defined independently of the Insertion Effect Blocks 20n. For explanation of the tone color switching process, a variable name used in the flow chart of FIG. 7 is represented in an abbreviation, "HT" in FIG. 13.

The parameter of "History" shown in FIG. 12 and the parameter of "Total History" shown in FIG.13 are management parameters which are used for detecting Effect that was assigned to Insertion Effect Blocks 20n from the very first. More specifically, every time when Effect is assigned to Insertion Effect Block 20n, CPU 13 increments "Total History" by "1", and substitutes a value of the management parameter of "Total History" for the management parameter of "History" corresponding to the Insertion Effect Block 20n that has been assigned with Effect this time.

In the flowcharts of FIGS. 7A, 7B and 7C, the management parameters relating to Insertion Effect Blocks 20*n* shown in FIGS. 12 and 13 are represented in "InsInfo", and a particular management parameter is identified by. "InsInfo[block number]. variable name". For example, the management parameter of "History" relating to Insertion Effect Block 20*n* (n=1) is identified by "InsInfo[0].HI".

Further, in FIG. 14 are shown management parameters which are defined for respective tone color parts PTs. A parameter of "Line Select" for deciding whether a tone color part PT is used or not, and a parameter of "Tone Number" for defining the tone color number of selected tone color information are included in the management parameters defined for respective tone color parts PTs. For explanation of the tone color switching process, variable names used in the flow chart of FIG. 7 are represented in abbreviation such as "LS" and "TN" in FIG. 14.

In the flow charts of FIGS. 7A, 7B and 7C,the management parameters which are defined for respective tone color part PTs shown in FIG. 14 are represented in "PartInfo", and a particular management parameter is identified by "PartInfo [part number] variable name". For example, the management parameter of "Tone Number" defined for respective tone color part PTs (s =11) is identified by "PartInfo[11].TN".

Further, "PartNum" represents the number of a tone color part PTs whose tone color information is selected and "ToneNum" represents a tone color number of the selected tone color information.

Now, referring to the flow charts shown in FIGS. 7A, 7B and 7C, the tone color switching process will be explained, using the parameters defined above.

At step S31 in FIG. 7A, CPU 13 sets a tone color information to a tone color part in response to user's operation of a tone color relating part of the switching unit 19 (PartInfo [PartNum]==ToneNum).

At step S32, CPU 13 judges based on Effect information in the set tone color information whether Effect is used or not (Tone [ToneNum].EE=0?). When it is determined at step S32 that Effect is not used, then CPU 13 advances to a process at step S33. Meanwhile, when it is determined at step S32 that Effect is used, then CPU 13 advances to a process at step S34.

CPU 13 determines to connect the tone color part PTs with the Direct Line DL (PartInfo[PartNum].LS=4) and finishes the process at step S33. In other words, DSP 20 is not used and no acoustic effect of insertion effects is added to the musical tone signal.

(Check of Algorithm of Prohibiting Share of Acoustic Effect)

CPU 13 judges at step S34 whether or not Distortion has been selected as an algorithm of Effect from the effect information (Tone[ToneNumber].AL==Distortion?). When Distortion has been selected (YES at step S34), CPU 13 advances to a process at step 43. Meanwhile, when no Distortion has been selected (NO at step S34), CPU 13 advances to a process at step 35.

At step 34, CPU 13 executes a process of avoiding a problem that when the same acoustic effect is applied to separate musical tone signals, Effect applied to one signal affects the other signal as a result of application of such acoustic effect. For example, such problem is that an acoustic effect applied on one musical tone signal, which has Effect for causing distortions, can affect Effect on other musical tone signal, when a separate musical tone signal is input. In other words, at step S34, CPU 13 previously excludes these sorts of Effects from the processes to be executed at step 35 and thereafter to avoid the disadvantage caused by the same Effect shared with separate musical tone signals.

(Checking for Insertion Effect Block 20*n* Available for Adding the Same Acoustic Effect)

At steps S35 to S42, CPU 13 executes a process for comparing management parameters of Effect information with those of Insertion Effect Blocks 20*n*, thereby checking for Insertion Effect block 20*n* available for adding the same acoustic effect as the Effect information of the preset tone color information (ins:0-3).

CPU 13 compares and judges at step S36 whether or not an algorithm of Effect information coincides with an algorithm of Effect previously set to Insertion Effect Block 20*n* (Tone [ToneNum].AL==InsInfo[ins].AL?). When the both algorithms coincide with each other (YES at step S36), CPU 13 advances to a process at step S37, and when the algorithms do not coincide with each other (NO at step S36), CPU 13 advances to the process at step S43.

At steps S37 to S39, CPU 13 executes a process of comparing all the general-purpose parameters of Effect information with general-purpose parameters of Effects previously set to the Insertion Effect Blocks 20*n* (p:0-7).

At step S38, CPU 13 compares the general-purpose parameter of Effect information with the general-purpose parameters of Effect previously set to Insertion Effect Block 20*n*, thereby judging whether or not these parameters coincide with each other (Tone[ToneNum].PR[p]==InsInfo[ins].PR [p]?). When these general-purpose parameters coincide with each other (YES at step S38), CPU 13 advances to a process at step S40, and when these general-purpose parameters do not coincide with each other (NO at step S38), CPU 13 advances to the process at step S43.

At step S40, CPU 13 compares an output level of the Effect information with an output level of Effect previously set to Insertion Effect Block 20*n* to judge whether or not these output levels coincide with each other (Tone[ToneNum]. LV==InsInfo[ins].LV?). When these output levels of Effects coincide with each other (YES at step S40), CPU 13 advances to a process at step S41, and when these output levels of Effects do not coincide with each other (NO at step S40), CPU 13 advances to the process at step S43.

At step S41, CPU 13 compares a panning position of an output of Effect information with a panning position of an output of Effect previously set to Insertion Effect Block 20*n* to judge whether or not these panning positions coincide with each other (Tone[ToneNum].PN==InsInfo[ins].PN?). When these panning positions of Effects coincide with each other (YES at step S41), CPU 13 determines that settings of all the Effects coincide with each other, and that there is no need to assign a fresh Effect to Insertion Effect Block 20*n* in DSP 20, and then advances to a process at S76 in FIG. 7C. Meanwhile, when these panning positions of Effects do not coincide with each other (NO at step S41), CPU 13 advances to the process at S43.

As described above, in response to change in setting of the original tone color information set to the tone color part PTs, CPU 13 compares the algorithms of Effect, general-purpose parameters defined for each algorithm, output level of Effect, and panning position of output of Effect of Effect information with those of Effect previously set to the original Insertion Effect Block 20*n*. Then, CPU 13 selects Insertion Effect Block 20*n*; in which all the above items coincide with those of the original Insertion Effect Block, as Insertion Effect Block 20*n* to be assigned to the tone color part PTs.

As described above, when the Insertion Effect Block 20*n* is selected, in which algorithm of Effect, general-purpose parameters defined for each algorithm, and panning position of Effect output completely coincide with the previously set items, Effect that meets the user's requirement in producing his or her desired sounds as much as possible can be automatically added to a musical tone signal.

(Searching for Insertion Effect Block 20*n* Not in Use)

At steps S43 to S45, CPU 13 searches for Insertion Effect Block 20*n* not in use(ins:0-3).

At step S44, CPU 13 refers to management parameters of respective Insertion Effect Blocks 20*r* to judge whether or not Insertion Effect Block 20*n* not in use is found (InsInfo [ins].US==0?). When an unused Insertion Effect Block 20*n* has been found (YES at step S44), CPU 13 advances to step S65 in FIG. 7C, where CPU 13 assigns a tone color part PTs to such Insertion Effect Block 20*n*. Meanwhile, when an unused Insertion Effect Block 20*n* has not been found (NO at step S44), CPU 13 executes processes at steps S45 and S46 in FIG. 7B.

Even in the case where Insertion Effect Block 20*n* which coincides with Effect information has not been found, if an used Insertion Effect Block 20*n* is available, such the unused Insertion Effect Block 20*n* can be used to be assigned to a tone color part PTs.

(Judging Whether Any Insertion Effect Block 20*n* Has Been Assigned to a Tone Color Part PTs)

At steps S46 to S51 in FIG. 7B, CPU 13 executes a process for judging whether or not any Insertion Effect Block 20*n* has been assigned to a tone color part PTs to be processed in the present routine process.

At step S46, CPU 13 executes an initializing setting to execute following processes including a process for judging whether or not any Insertion Effect Block 20*n* has already been assigned to the tone color part PTs to be processed in the present routine process, and a process for judging whether or not such Insertion Effect Block 20*n* is shared with other tone color part Pts when the Insertion Effect Block 20*n* has been assigned to the tone color part PTs (ins=PartInfo[PartNum].LS).

At step S47, CPU 13 judges whether or not Direct Line DL has been connected to a tone color part PTs to be processed in the present routine process (ins==4?). When Direct Line DL has been connected to the tone -color part PTs (YES at step S47), CPU 13 advances to a process at step S52, and when the Direct Line DL has not been connected to the tone color part PTs (NO at step S47), CPU 13 advances to a process at step S48.

At steps S48 to S51, CPU 13 selects and verifies all 16 tone color parts PTs one by one to judge whether or not Insertion effect block 20*n* assigned to the tone color part PTs to be processed in the present routine process is shared with other tone color part PTs (part:0-15).

At step S49, CPU 13 successively increments the part number (part:0-15) to select a tone color part PTs, and judges whether or not the selected tone color part PTs is the same as the tone color part PTs to be processed in the routine process (PartNum==part?). When the selected tone color part PTs is the same as the tone color part PTs to be processed in the routine process (YES at step S49), CPU 13 returns to the process at step S48, where CPU 13 selects a tone color part PTs of the following part number. Meanwhile, when the selected tone color part PTs is not the same as the tone color part PTs to be processed in the routine process (NO at step S49), CPU 13 advances to a process at step S50.

At step S50, CPU 13 refers to the management parameters of the tone color part PTs selected at step S49, thereby judging whether or not the tone color part PTs selected at step S49 is connected with the same Insertion Effect Block 20*n* as the Insertion Effect Block 20*n* connected with the tone color part PTs to be processed in the present routine process (PartInfo [Part].LS==ins?). When the tone color part PTs selected at step S49 is connected with the same Insertion Effect Block 20*n* as the Insertion Effect Block 20*n* connected with the tone color part PTs to be processed in the present routine process (YES at step S50), CPU 13 advances to a process at S52. In the other case, CPU 13 advances to a process at step S65 in FIG. 7C, where CPU 13 executes a process for assigning the Insertion Effect Block 20*n* to a tone color part PTs.

As described above, in the case where Insertion Effect Block 20*n* that coincides with the effect information is not found and further an unused Insertion Effect Block 20*n* is not found, CPU 13 judges whether or not the tone color part PTs to be processed in the present routine process has already been assigned with Insertion Effect Block 20*n*. Further, when the Insertion Effect Block 20*n* assigned to the tone color part PTs is found, CPU 13 selects said Insertion Effect Block 20*n*. Further, to set fresh effect information to the Insertion Effect Block 20*n*, CPU 13 further judges whether or not said Insertion Effect Block 20*n* is shared with other tone color part PTs.

A technique of "seamless change" is available. This technique of "seamless change" is for changing a tone color of a tone color part PTs with sound reverberation remained while sounds are being generated. When a tone color is changed, the technique of "seamless change" provides a musical tone signal without giving users acoustically unpleasant feeling, but this technique of "seamless change" has a disadvantage that can apply unnecessary acoustic effects to the musical tone signal, when Effect is switched. Application of Insertion Effect Block 20*n* already assigned to a tone color part PTs allows to switch the acoustic effect instantly at the same time when the tone color is switched, whereby the disadvantages of the "seamless change" technique are avoided.

(Searching for Insertion Effect Block 20*n* With No Sound Assigned Thereto)

At steps S52 to S54, CPU 13 searches for Insertion Effect Block 20*n* with no sound assigned thereto (ins:0-3).

At step S53, CPU 13 refers to the management parameters for each Insertion Effect Block 20*n* to judge whether or not an oscillator 16Am is connected to the Insertion Effect Block 20*n* (InsInfo[ins].No 0?). In other words, CPU 13 judges at step S53 whether or not there is any Insertion Effect Block 20*n* assigned to a tone color part PTs which is generating no musical tone.

When no oscillator 16Am is connected to Insertion Effect Block 20*n*, CPU 13 advances to a process at step S65 in FIG. 7C, where CPU 13 assigns the Insertion Effect Block 20*n* to a tone color part PTs. Meanwhile, when an oscillator 16Am is connected to Insertion Effect Block 20*n*, CPU 13 advances to a process at step S55 in FIG. 7B.

As described above, in the case where Insertion Effect Block 20 which coincides with effect information is not found, and an unused Insertion Effect Block 20 is not found, and further Insertion Effect Block 20 which is assigned solely to a tone color part PTs to be processed in the routine process is not found, CPU 13 selects Insertion Effect Block 20*n* generating no sound, i.e. Insertion Effect Block 20*n* assigned to a tone color part PTs which generates no musical tone, thereby minimizing disadvantage caused at the time when a fresh Effect is set.

When there is no Insertion Effect Block 20*n* generating no sound, modification maybe made that CPU 13 selects Insertion Effect Block 20*n* generating least number of sounds, i.e. Insertion Effect Block 20*n* assigned to a tone color part PTs which generates least number of musical tones, thereby minimizing the above disadvantage.

(Searching for Insertion Effect Blocks 20*n* of the Same Algorithm)

At steps S55 to S57, CPU 13 executes a process for comparing an algorithm of the effect information with algorithms of Effects already set to Insertion Effect Blocks 20*n* to search for Insertion Effect Block 20*n* to which Effect of the same algorithm has been set (ins:0-3).

At step S56, CPU 13 compares the algorithm of the effect information with the algorithm of Effect already set to Insertion Effect Block 20*n*, thereby judging whether or not these algorithms coincide with each other (InsInfo[ins].AL Tone [ToneNum]AL?). When these algorithms coincide with each other (YES at step S56), CPU 13 advances to the process at step S56 in FIG. 7C, where CPU 13 assigns the Insertion Effect Block 20*n* to a tone color part PTs. When these algorithms do not coincide with each other (NO at step S56), CPU 13 advances to processes at steps S57 and S58 in FIG. 7C.

As described above, in the case where Insertion Effect Block 20 which coincides with effect information is not found, and an unused Insertion Effect Block 20 is not found, and Insertion Effect Block 20 which is assigned solely to a tone color part PTs to be processed in the routine process is not found, and further Insertion Effect Block 20*n* generating no sound at present is not found, CPU 13 selects Insertion Effect Block 20*n* whose algorithm at least coincides with the algorithm of the effect information, thereby minimizing disadvantage caused at the time when fresh effect information is set.

(Searching for Insertion Effect Block 20*n* Used From the Very First)

At steps S58 to S64 in FIG. 7C, CPU 13 executes a process for searching for Insertion Effect Block 20*n* used from the very first.

At step S58, CPU 13 sets initial parameters for executing the process of searching for Insertion Effect Block 20*n* used from the very first (ins=0, a=InsInfo[0].HI) at step S59. At step S59, a value of "a" is set to the management parameter "History" of Insertion Effect Block 20*n* of ins=0. This value "a" is used as a reference value for the comparing process to be executed at steps S60 to S64.

At steps S60 to S64, CPU 13 executes a process for searching for the minimum value of the management parameter "History" of Insertion Effect Block 20*n* (i:1-3).

At step S61, CPU 13 judges whether or not Insertion Effect Block 20*n* whose "History" is larger than the reference value of "a" is found (a<InsInfo[i]/HI?). When Insertion Effect Block 20*n* whose "History" is larger than the reference value of "a" has been found (YES at step S61), CPU 13 determines that "History" of Insertion Effect Block 20*n* of ins=0 is minimum, and advances to a process at step S65. When Insertion Effect Block 20*n* whose "History" is larger than the reference value of "a" has not been found (NO at step S61), CPU 13 advances to a process at step S62.

At steps S62 and S63, CPU 13 sets the reference value of "a" successively to the management parameter "History" of Insertion Effect Block 20*n* of ins=1-3, thereby changing the reference value for comparing processes (a=InsInfo[i].HI, ins =i), and repeats the judging process at step S61 to search for the minimum value of "History" of Insertion Effect Block 20*n*. When the minimum value of "History" of Insertion Effect Block 20*n* has been found, CPU 13 advances to the process at step S65.

CPU 13 uses the Insertion Effect Block 20*n* whose management parameter "History" has the minimum value as Insertion Effect Block 20*r* to be assigned to a tone color part PTs, and executes processes on the Insertion Effect Block 20*r* at step S65 and thereafter.

As described above, in the case where Insertion Effect Block 20 which coincides with effect information is not found, and an unused Insertion Effect Block 20 is not found, and Insertion Effect Block 20 which is assigned solely to a tone color part PTs to be processed in the routine process is not found, and Insertion Effect Block 20*n* generating no sound at present is not found, and further Insertion Effect Block 20*n* which has at least the same algorithm as the algorithm of the effect information is not found, CPU 13 selects the Insertion Effect Block 20*n* assigned from the very first, thereby minimizing disadvantage caused at the time when fresh effect information is set.

(Assigning Insertion Effect Block 20*n*)

At steps S65 to S76, CPU 13 updates the management parameters of the selected Insertion Effect Block 20*n*, and assigns the selected Insertion Effect Block 20*n* to the tone color part PTs to be processed in the present routine process.

At step S65, CPU 13 sets the management parameter "Use" of Insertion Effect Block 20*n* to be assigned to the tone color part PTs to "In Use" (InsInfo[ins].US=11).

At step S66, CPU 13 substitutes a value of "Total History" for the management parameter "History" of the Insertion Effect Block 20*n* to be assigned to the tone color part PTs (InsInfo[ins].HI=TH).

At step S67, CPU 13 increments the value of the management parameter "Total History" by "1" (TH=TH+1).

At step S68, CPU 13 sets a value f "0" to the management parameter "Number of Oscillator" of the Insertion Effect Block 20*n* to be assigned to the tone color part PTs (InsInfo [ins].No =0).

At step S69, CPU 13 sets following two parameters equivalent to each other, wherein one is the management parameter "Algorithm" of the Insertion Effect Block 20*n* to be assigned to the tone color part PTs and the other is the parameter "Algorithm" of effect information (InsInfo[ins].AL=Tone{ToneNum}.AL).

At steps S70 to S72, CPU 13 executes a process for setting two parameters equivalent to each other, wherein one is the management parameter "Parameter[p]" of the Insertion Effect Block 20*n* to be assigned to the tone color part PTs and the other is the parameter "Parameter[p]" of effect information (p:0-7).

At step S71, CPU 13 sets two parameters equivalent to each other, wherein one is the management parameter "Parameter [p]" of the Insertion Effect Block 20*n* to be assigned to the tone color part PTs and the other is the parameter "Parameter [p]" of the effect information (InsInfo[ins]. RP[p] =Tone{ToneNum}.RP[p]).

At step S73, CPU 13 sets two parameters equivalent to each other, wherein one is the management parameter "Level" of the Insertion Effect Block 20*n* to be assigned to the tone color part PTs and the other is the parameter "Level" of the effect information (InsInfo[ins].LV=Tone{ToneNum}.LV).

At step S74, CPU 13 sets two parameters equivalent to each other, wherein one is the management parameter "Pan" of the Insertion Effect Block 20*n* to be assigned to the tone color part PTs and the other is the parameter "Pan" of effect information (InsInfo[ins].PN=Tone{ToneNum}.PN).

At step S75, CPU 13 executes a setting process of DSP 20 corresponding to the Insertion Effect Block 20*n* to be assigned to the tone color part PTs, and quits producing sounds using the Insertion Effect Block 20*n*.

At step S76, CPU 13 sets the management parameter "Line-Select" of the tone color part PTs to Insertion Effect Block 20*n* to be connected with the tone color part PTs (PartInfo[PartNum].LS=ins).

Figure 8:
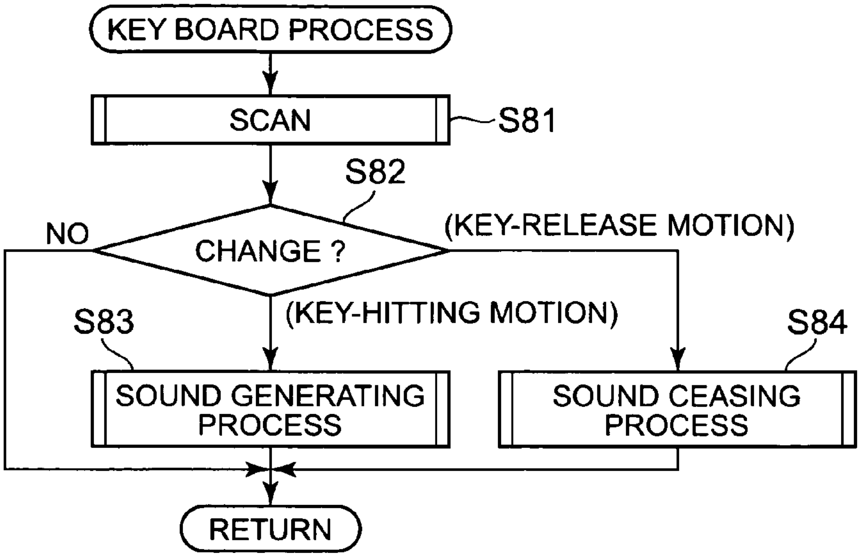
FIG. 8 is a flow chart illustrating a key board operation in the musical tone generating apparatus.
Figure 9:
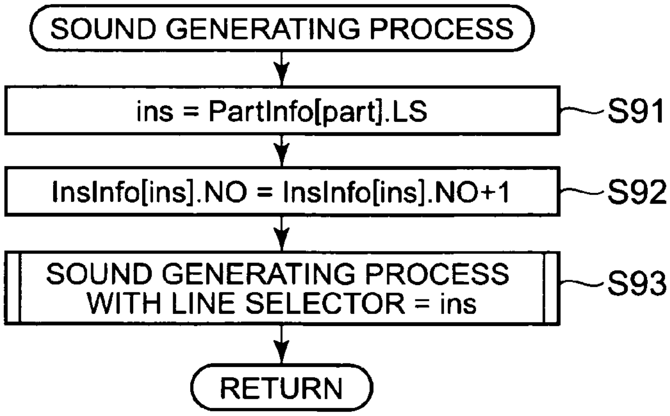
FIG. 9 is a flow chart illustrating a sound generating process in the musical tone generating apparatus.
Figure 10:
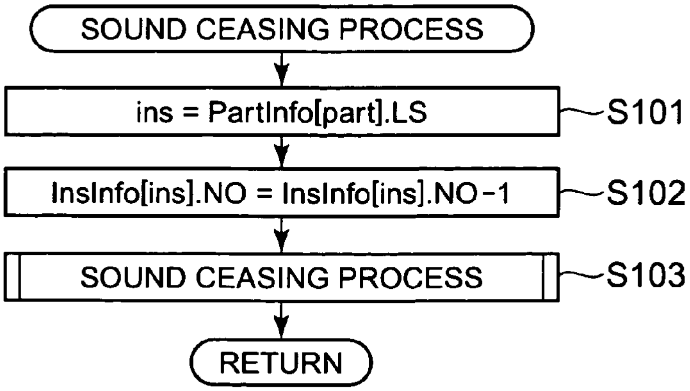
FIG. 10 is a flow chart illustrating a sound ceasing process in the musical tone generating apparatus.

Now, a process to be executed at step S3 in FIG. 4 in response to the user's key board operation will be described with reference to the flow chart shown in FIG. 8.

CPU 13 controls the scanner 12 to scan the state of the key board 11 at step S81 to detect change in played state at step S82. When no change in the state of the key board 11 has been detected (NO at step S82), CPU 13 ceases the process. Meanwhile, when key-hitting motion on the key board 11 has been detected, CPU 13 advances to a process at step S83, and when key-release motion on the key board 11 has been detected, CPU 13 advances to a process at S84.

At step S83, CPU 13 executes a sound generating process. The sound generating process will be described with reference to the flow chart of FIG. 9.

CPU 13 identifies an Insertion Effect Block 20*n* connected to a tone color part PTs at step S91, and increments a value of the management parameter "Number of Oscillator" of Insertion Effect Block 20*n* by a value of "1" to execute the sound generating process at step S92. Further, CPU 13 physically moves the line selector LS to connect an oscillator 16Am with the Insertion Effect Block 20*n*, thereby executing the sound generating process at step S93.

At step S84, CPU 13 executes a sound ceasing process. The sound ceasing process will be described with reference to the flow chart of FIG. 10.

CPU 13 identifies Insertion Effect Block 20*n* connected to the tone color part PTs at step S101, and decrements at step S102 a value of the management parameter "Number of Oscillator" of the Insertion Effect Block 20*n* by a value of "1" to execute the sound ceasing process. Further, CPU-13 physically moves the line selector LS to disconnect the oscillator 16Am from the Insertion Effect Block 20*n*, thereby executing the sound ceasing process at step S103.

As described above, in the embodiment of the musical tone generating apparatus 1 according to the invention, when arrangement is made for assigning Insertion Effect Block 20*n* to a tone color part PTs to be processed, CPU 13 searches for and uses an Insertion Effect Block 20*n* whose acoustic effect is shared with a large number of Insertion Effect Blocks 20*n* from among plural Insertion Effect Blocks 20*n* already assigned to any tone color parts PTs.

And, when Insertion Effect Block 20*n* whose acoustic effect is shared with a large number of Insertion Effect Blocks 20*n* has not been found, CPU 13 selects an Insertion Effect Block 20*n* based on a predetermined reference value for selection, at which least influence is caused when Insertion Effect Block 20*n* is assigned to a new tone color part PTs to be processed. Then, CPU 13 uses the selected Insertion Effect Block 20*n*.

In the musical tone generating apparatus 1, without disturbing the user in producing his or her desired sounds, acoustic effects are automatically and separately added to musical tone signals generated based on the tone color information set to plural tone color parts PTs.

In the embodiment of the musical tone generating apparatus 1 according to the invention, when a tone color is switched, CPU 13 compares values of the parameters to judge whether or not Effect close to the Effect necessary has been already assigned to Insertion Effect Block 20*n*, as described with reference to the flow chart (steps S35 to S42) of FIG. 7A. But to the above embodiment may be made modification that includes tone color information whose Effect can be shared with other tone color information among previously set tone color information and simply refers to said tone color information to judge whether or not the equivalent Effect has been set.

The foregoing description of the preferred embodiments of the invention has been presented for the purposes of illustration and description. It is not intended to limit the invention to the precise form disclosed. Many modifications and variations can be made in light of the above teaching without departing from the spirit and scope of the invention.

What is claimed is:

1. An acoustic-effect assignment controlling apparatus comprising:

a certain number of acoustic-effect adding units for adding acoustic effects independently of each tone color part to musical tone signals based on acoustic-effect information included in tone color information, wherein the certain number of the acoustic-effect adding units is less than the number of the tone color parts and the musical tone signals are generated based on plural pieces of tone color information set to plural tone color parts, respectively; and an assignment controlling unit for setting to the acoustic-effect adding unit the acoustic-effect information included in the tone color information set to the tone color part, thereby assigning the acoustic-effect adding unit to the tone color part, wherein the assignment controlling unit comprises:

a judging unit for, when an original tone color information set to either of the tone color parts has been changed to another tone color information, judging whether or not an acoustic-effect adding unit is found for adding the same acoustic effect as an acoustic effect based on acoustic-effect information included in the another tone color information, including a changed tone color information; and an assigning unit for, when the judging unit determines that an acoustic-effect adding unit is found for adding the same acoustic effect as the acoustic effect based on the acoustic-effect information included in the changed tone color information, assigning the acoustic-effect adding unit for adding the same acoustic-effect information to the tone color part whose original tone color information has been changed, and for, when the judging unit determines that no acoustic-effect adding unit is found for adding the same acoustic effect as the acoustic effect based on the acoustic-effect information included in the changed tone color information, setting the acoustic-effect information included in the color tone information set to the tone color part whose original tone color information has been changed to an acoustic-effect adding unit selected based on a predetermined selection reference, thereby assigning the acoustic-effect adding unit to the tone color part whose original tone color information has been changed.

2. The acoustic-effect assignment controlling apparatus according to claim 1, wherein the assignment controlling unit comprises:

a controlling unit for judging whether or not the acoustic effect based on the acoustic-effect information included in the changed tone color information is a particular acoustic effect, and for controlling the assigning unit to set acoustic-effect information included in the tone color information set to the tone color part whose original tone color information has been changed to the acoustic-effect adding unit selected based on the predetermined reference without making the judging unit execute a judgment process, when it is determined that the acoustic effect based on the acoustic-effect information is a particular acoustic effect, and for controlling the judging unit to judge whether or not the acoustic-effect adding unit is found for adding the same acoustic effect as the acoustic effect based on the acoustic-effect information included in the changed tone color information, when it is determined that the acoustic effect based on the acoustic-effect information is not a particular acoustic effect.

3. The acoustic-effect assignment controlling apparatus according to claim 1, wherein the acoustic-effect information includes acoustic-effect algorithms, parameters defined for each acoustic-effect algorithm, an output level of an acoustic effect, and an output panning of an acoustic effect, and when judging whether or not an acoustic-effect adding unit is found for adding the same acoustic effect as the acoustic effect based on the acoustic-effect information included in the changed tone color information, the judging unit judges whether all the acoustic-effect algorithms, parameters defined for each acoustic-effect algorithm, output levels of acoustic effects, and output panning of acoustic effects included in both acoustic-effect information coincide with each other or not.

4. The acoustic-effect assignment controlling apparatus according to claim 1, wherein when the judging unit determines that an acoustic-effect adding unit is not found for adding the same acoustic effect as the acoustic effect based on the acoustic-effect information included in the changed tone color information, the assigning unit judges whether or not an acoustic-effect adding unit is found which is not assigned to any tone color part at present, and when it is determined that an acoustic-effect adding unit is found which is not assigned to any tone color part at present, the assigning unit sets the acoustic-effect information included in the tone color information set to the tone color part whose original tone color information has been changed to the acoustic-effect adding unit which is not assigned to any tone color part, thereby assigning the acoustic-effect adding unit to the tone color part whose original tone color information has been changed.

5. The acoustic-effect assignment controlling apparatus according to claim 4, wherein when it is determined that an acoustic-effect adding unit is not found which is not assigned to any tone color part at present, the assigning unit further judges whether or not the acoustic-effect adding unit already assigned to the tone color part whose original tone color information has been changed is assigned to another tone color part, too, and when it is determined that the acoustic-effect adding unit already assigned to the tone color part whose original tone color information has been changed is not assigned to another tone color part, the assigning unit sets the acoustic-effect information which is included in the tone color information set to the tone color part whose original tone color information has been changed to the acoustic-effect adding unit which is already assigned to the tone color part whose original tone color information has been changed.

6. The acoustic-effect assignment controlling apparatus according to claim 5, wherein when it is determined that the acoustic-effect adding unit already assigned to the tone color part whose original tone color information has been changed is also assigned to another tone color part, the assigning unit further judges whether or not an acoustic-effect adding unit is found which is assigned to a tone color part generating no sound at present among the plural tone color parts, and when it is determined that an acoustic-effect adding unit is found which is assigned to a tone color part generating no sound at present, the assigning unit sets the acoustic-effect information which is included in the tone color information set to the tone color part whose original tone color information has been changed to the acoustic-effect adding unit which is assigned to the tone color part generating no sound, thereby assigning the acoustic-effect adding unit to the tone color part whose original tone color information has been changed.

7. The acoustic-effect assignment controlling apparatus according to claim 6, wherein when it is determined that an acoustic-effect adding unit is not found which is assigned to a tone color part generating no sound at present, the assigning unit further judges whether or not an acoustic-effect adding unit is found which is set with acoustic-effect information including the same acoustic-effect algorithm as an acoustic-effect algorithm which is one of plural pieces of acoustic-effect information included in the tone color information set to the tone color part whose original tone color information has been changed, and when it is determined that the acoustic-effect adding unit is found which is set with acoustic-effect information including the above same acoustic-effect algorithm, the assigning unit sets the acoustic-effect information included in the tone color information set to the tone color part whose original tone color information has been changed to the acoustic-effect adding unit which is set with the acoustic-effect information including the above same acoustic-effect algorithm, thereby assigning the acoustic-effect adding unit to the tone color part whose original tone color information has been changed.

8. The acoustic-effect assignment controlling apparatus according to claim 7, wherein when it is determined that an acoustic-effect adding unit is not found which is set with acoustic-effect information including the same acoustic-effect algorithm as an acoustic-effect algorithm which is one of plural pieces of acoustic-effect information included in the tone color information set to the tone color part whose original tone color information has been changed, the assigning unit selects the acoustic-effect adding unit which is set from the very first from among the acoustic-effect adding units assigned to the plural tone color parts, and sets the acoustic-effect information included in the tone color information set to the tone color part whose original tone color information has been changed to the selected acoustic-effect adding unit, thereby assigning the acoustic-effect adding unit to the tone color part whose original tone color information has been changed.

9. A computer readable medium mounted on an acoustic-effect assignment controlling apparatus and having recorded thereon an acoustic-effect assignment controlling program when executed to make a computer implement an acoustic-effect assigning method, wherein acoustic-effect assignment controlling apparatus has a certain number of acoustic-effect adding units for adding acoustic effects independently of each tone color part to musical tone signals based on acoustic-effect information included in tone color information, wherein the certain number of the acoustic-effect adding units is less than the number of the tone color parts and the musical tone signals are generated based on plural pieces of tone color information set to plural tone color parts, respectively; and a computer for setting to the acoustic-effect adding unit the acoustic-effect information included in the tone color information set to the tone color part, thereby assigning the acoustic-effect adding unit to the tone color part, the acoustic-effect assigning method comprising:

a judging step for, when the tone color information set to either of the tone color parts has been changed, judging whether or not an acoustic-effect adding unit is found for adding the same acoustic effect as an acoustic effect based on acoustic-effect information included in the changed tone color information; and an assigning step for, when it is determined that an acoustic-effect adding unit is found for adding the same acoustic effect as the acoustic effect based on the acoustic-effect information included in the changed tone color information, assigning the acoustic-effect adding unit for adding the same acoustic-effect information to the tone color part whose original tone color information has been changed, and for, when it is determined that an acoustic-effect adding unit is not found for adding the same acoustic effect as the acoustic effect based on the acoustic-effect information included in the changed tone color information, setting the acoustic-effect information included in the color tone information set to the tone color part whose original tone color information has been changed to an acoustic-effect adding unit selected based on a predetermined selection reference, thereby assigning the acoustic-effect adding unit to the tone color part whose original tone color information has been changed.

* * * * *

UNITED STATES PATENT AND TRADEMARK OFFICE

CERTIFICATE OF CORRECTION

PATENT NO. : 7,795,525 B2
APPLICATION NO. : 12/075725
DATED : September 14, 2010
INVENTOR(S) : Hiroki Sato It is certified that error appears in the above-identified patent and that said Letters Patent is hereby corrected as shown below:

On the title page:

Under Item (56) FOREIGN PATENT DOCUMENTS;

add --JP 6-027951 A 02-04-1994

JP 10-091160 A 04-10-1998

JP 5-150784 A 06-18-1993

JP 2001-067078 A 03-16-2001--.

Signed and Sealed this
Thirteenth Day of September, 2011

David J. Kappos
*Director of the United States Patent and Trademark Office*